United States Patent
Kim et al.

(10) Patent No.: US 9,549,172 B2
(45) Date of Patent: Jan. 17, 2017

(54) STEREOSCOPIC IMAGE DISPLAY DEVICE AND METHOD FOR DRIVING THE SAME

(71) Applicant: LG Display Co., Ltd., Seoul (KR)

(72) Inventors: Myeongdo Kim, Paju-si (KR);
Hanseok Kim, Paju-si (KR);
Myungsoo Park, Seoul (KR);
Seonghwan Ju, Gangneung-si (KR)

(73) Assignee: LG Display Co., Ltd., Seoul (KR)

( * ) Notice: Subject to any disclaimer, the term of this patent is extended or adjusted under 35 U.S.C. 154(b) by 213 days.

(21) Appl. No.: 14/104,797

(22) Filed: Dec. 12, 2013

(65) Prior Publication Data
US 2014/0292789 A1 Oct. 2, 2014

(30) Foreign Application Priority Data

Mar. 29, 2013 (KR) .................. 10-2013-0034211

(51) Int. Cl.
*H04N 13/04* (2006.01)

(52) U.S. Cl.
CPC ...... *H04N 13/0468* (2013.01); *H04N 13/0413* (2013.01); *H04N 13/0447* (2013.01)

(58) Field of Classification Search
None
See application file for complete search history.

(56) References Cited

U.S. PATENT DOCUMENTS

| | | | | |
|---|---|---|---|---|
| 2013/0057575 A1* | 3/2013 | An | ........................ | H04N 13/047 345/619 |
| 2013/0076724 A1* | 3/2013 | Park | .................. | G02B 27/2264 345/212 |
| 2013/0222365 A1* | 8/2013 | Lee | .................... | G02B 27/2214 345/419 |
| 2014/0192172 A1* | 7/2014 | Kang | .................. | G02B 27/2214 348/55 |

FOREIGN PATENT DOCUMENTS

| | | |
|---|---|---|
| CN | 103002303 A | 3/2013 |
| WO | WO 2012/044130 A2 | 4/2012 |

OTHER PUBLICATIONS

Chinese First Office Action, Chinese Application No. 201310670035.1, Aug. 21, 2015, 12 pages.

* cited by examiner

*Primary Examiner* — Maurice L McDowell, Jr.
*Assistant Examiner* — Donna J Ricks
(74) *Attorney, Agent, or Firm* — Fenwick & West LLP

(57) ABSTRACT

Provided is a stereoscopic image display device comprising a display panel displaying a multi-view image in a three-dimensional (3D) mode, a switchable barrier forming a barrier in the 3D mode, a user position detecting unit outputting a user position data including a user position information, a switchable barrier controlling unit calculating an average picture level of the multi-view image in the 3D mode and controlling an aperture ratio of the switchable barrier according to the average picture level and the user (Continued)

position information, a switchable barrier driving unit supplying driving voltages to divided electrodes of the switchable barrier and supplying a common voltage to a barrier common electrode, and a display panel driving unit converting the multi-view image into data voltages to supply the data voltages to data lines of the display panel and sequentially supplying gate pulses to gate lines of the display panel.

16 Claims, 11 Drawing Sheets

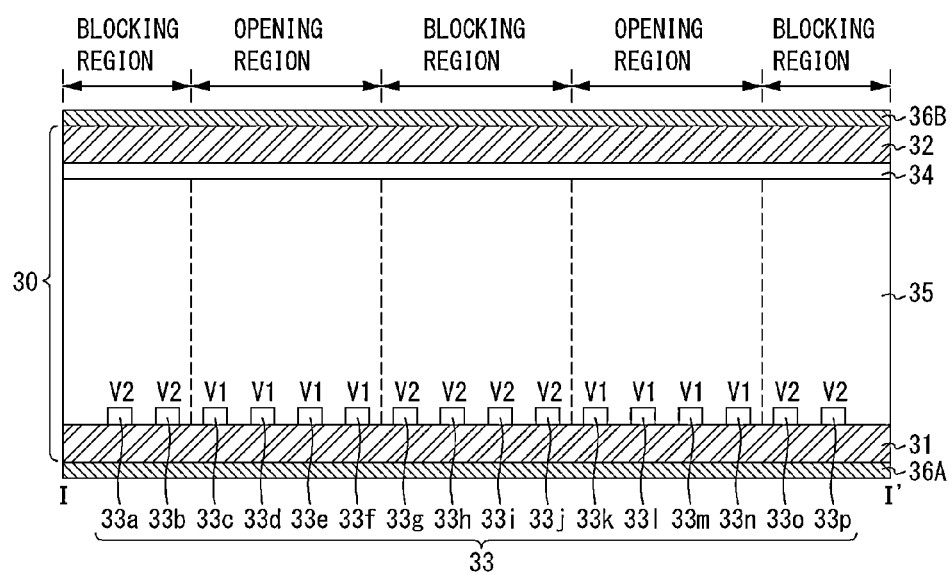

STEREOSCOPIC IMAGE DISPLAY DEVICE AND METHOD FOR DRIVING THE SAME

This application claims the priority benefit of Korean Patent Application No. 10-2013-0034211 filed on Mar. 29, 2013, which is incorporated herein by reference for all purposes as if fully set forth herein.

BACKGROUND

Field

The present invention relates to a stereoscopic image display device and a method for driving the same.

Related Art

The stereoscopic image display device is classified as either a stereoscopic technique or an autostereoscopic technique. The stereoscopic technique uses a binocular parallax image between the left and right eyes of a viewer to establish the perception of three-dimensional (3D) depth. Techniques for implementing the binocular parallax image include glasses types and non-glasses types. The glasses type includes a patterned retarder type that displays the left and right parallax images to be displayed on a display panel in different polarization direction and implements a 3D image using a polarized glasses and a shutter glass type that displays the left and right parallax images on the display panel in a time sharing manner and implements the 3D image using a liquid crystal shutter glass. In the non-glasses type, the 3D images may be implemented by separating the left and right parallax images using an optical plate such as a parallax barrier, lenticular lens, or the like.

The parallax barrier is for separating the left and right parallax images using a barrier plate blocking light, such that the 3D image may be implemented. However, in the parallax barrier, a two-dimensional (2D) luminance of the stereoscopic image display device using the parallax barrier is low because of parallax barrier. Recently, in order to supplement the 2D luminance of the stereoscopic image display device due to the parallax barrier, a switchable barrier which is formed only in a 3D mode without the barrier being formed in a 2D mode has been proposed. The switchable barrier may control a region where the barrier is formed using liquid crystal. As a result, after detecting a position of a user, a user tracking technology changing a forming position of the barrier for the switchable barrier according to the position of the user has been proposed.

The user tracking technology allows the user to watch optimal 3D images regardless of the position of the user by changing the forming position of the barrier according to the position of the user. However, since the user tracking technology changes the forming position of the barrier by analyzing the position of the user after a movement of the user is completed, a predetermined time interval is present from the time when the movement of the user is completed to the time when the forming position of the barrier is changed. For example, when the user moves from orthoscopic viewing region to a barrier viewing region during the predetermined time interval, since watching 3D images is blocked, the user may feel a flicker. The orthoscopic viewing region indicates a region where the left-eye of the user watches the left parallax image and the right-eye of the user watches the right parallax image, the barrier viewing region indicates a region where a black pattern corresponding to the barrier rather than the 3D image shown, and the flicker means flickering. Consequently, the user may feel inconvenience in the watching the 3D images during the predetermined time interval.

SUMMARY

A stereoscopic image display device according to the present invention comprises: a display panel displaying a multi-view image in a 3D mode; a switchable barrier providing on the display panel in order to separate the multi-view images to form a barrier in the 3D mode; a user position detecting unit outputting a user position data including a user position information by analyzing an image displayed on a front surface of the display panel photographed with a camera; a switchable barrier controlling unit calculating an average picture level of the multi-view image data in the 3D mode and controlling an aperture ratio of the switchable barrier according to the average picture level and the user position information; a switchable barrier driving unit supplying driving voltages to divided electrodes of the switchable barrier under controlling of the switchable barrier controlling unit and supplying a common voltage to a barrier common electrode; and a display panel driving unit converting the multi-view image data into data voltages to supply the data voltages to data lines of the display panel and sequentially supplying gate pulses synchronized with the data voltages to gate lines of the display panel.

A method of driving a stereoscopic image display device including a display panel displaying multi-view images in a 3D mode and a switchable barrier providing on the display panel in order to separate the multi-view images to form a barrier in the 3D mode, the method comprising: outputting a user position data including a user position information by analyzing an image displayed on a front surface of the display panel photographed with a camera; calculating an average picture level of the multi-view image data in the 3D mode and controlling an aperture ratio of the switchable barrier according to the average picture level and the user position information; supplying driving voltages to divided electrodes of the switchable barrier and supplying a common voltage to a barrier common electrode; and converting the multi-view image data into data voltages to supply the data voltages to data lines of the display panel and sequentially supplying gate pulses synchronized with the data voltages to gate lines of the display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 8 is a view showing first to third barrier control data stored in first to third look-up tables;

FIGS. 9A and 9B are views showing an opening region and a blocking region of a switchable barrier according to an aperture ratio;

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
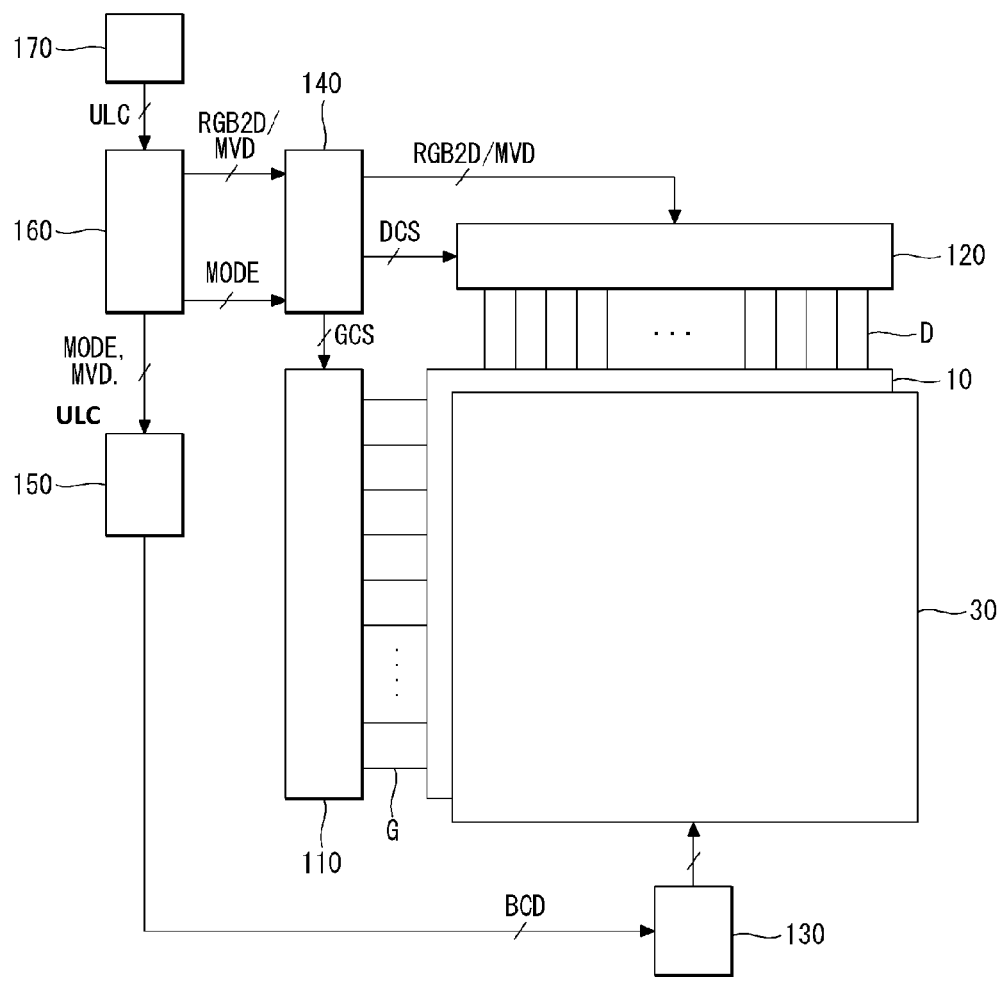
FIG. 1 is a block view schematically showing a stereoscopic image display device according to an exemplary embodiment of the present invention.

FIG. 1 is a block view schematically showing a stereoscopic image display device according to an exemplary embodiment of the present invention. Referring to FIG. 1, the stereoscopic image display device includes a display panel 10, a switchable barrier 30, a display panel driving unit 120, a switchable barrier driving unit 130, a display panel controlling unit 140, a switchable barrier controlling unit 150, a host system 160, a user position detecting unit 170, and the like.

The stereoscopic image display device according to the exemplary embodiment of the present invention may be implemented by a flat panel display device such as a liquid crystal display (LCD), a field emission display (FED), a plasma display panel (PDP), an organic light emitting diode (OLED), or the like. Although the present invention mainly describes a liquid crystal display device in the following embodiment, the present invention is not limited thereto.

The display panel 10 includes a liquid crystal layer formed between two substrates. On a lower substrate of the display panel 10, data lines D and gate lines G (or scanning lines) are formed to intersect with each other and a thin film transistor (hereinafter, referred to TFT) array that pixels are arranged in a matrix form in cell regions defined by the data lines D and the gate lines G is formed. Each pixel of the display panel 10 is connected to the thin film transistor and is driven by electric field between a pixel electrode and a liquid crystal common electrode.

On an upper substrate of the display panel 10, a color filter array including a black matrix, a color filter, and the like is formed. An upper polarizing plate is attached on the upper substrate of the display panel 10 and a lower polarizing plate is attached on the lower substrate thereof. A light penetration axis of the upper polarizing plate may be formed to be orthogonal to a light penetration axis of the lower polarizing plate. In addition, alignment layers for setting a pre-tilt angle of the liquid crystals are respectively formed on the upper and lower substrates. A spacer for maintaining a cell gap of a liquid crystal cell is formed between the upper and lower substrates of the display panel 10.

The liquid crystal common electrode is formed on the upper substrate in a vertical field driving mode such as a twisted nematic (TN) mode or a vertical alignment (VA) mode and on the lower substrate together with a pixel electrode in a horizontal field driving mode such as an in plane switching (IPS) mode or a fringe field switching (FFS) mode. The liquid crystal mode of the display panel 10 may also be implemented in any liquid crystal mode as well as the TN mode, the VA mode, the IPS mode, and the FFS mode described above.

The display panel 10 displays a 2D image in a 2D mode and a multi-view image in a 3D mode. The multi-view image includes the first to n-th (n is an integer of 2 or more) view images. The multi-view images are generated by photographing an object using cameras which are spaced apart from each other by the binocular interval of the common people. For example, when four cameras are spaced apart from each other by the binocular interval to photograph the object, the display panel 10 displays a first to a fourth view images.

The display panel 10 may be a penetrate type liquid crystal display panel modulating the light from a backlight unit. The backlight unit includes a light source, a light guide plate (or light diffusion plate), a plurality of optical sheet, and the like lighting according to a driving current supplied from a backlight unit-driving unit. The backlight unit may be implemented by a direct type or an edge type backlight unit. The light sources of the backlight unit may include at least any one or two among a hot cathode fluorescent lamp (HCFL), a cold cathode fluorescent lamp (CCFL), an external electrode fluorescent lamp (EEFL), a light emitting diode (LED), an organic light emitting diode (OLED).

The backlight unit-driving unit generates a driving current for lighting the light sources of the backlight unit. The backlight unit-driving unit turns on/off the driving current supplied to the light sources under controlling of a backlight controlling unit. The backlight controlling unit converts backlight control data including a duty-ratio control value of a pulse width modulation (PWM) signal into a serial peripheral interface (SPI) data format according to a global/local dimming signal (DIM) input from the host system 160 to transmit the converted data to the backlight driving unit.

A data driving unit 120 includes a plurality of source drive integrated circuits (ICs). The source drive ICs convert 2D image data RGB2D or multi-view image data MVD input from the display panel controlling unit 140 into a positive polarity/negative polarity gamma compensation voltage to generate analog data voltages. The analog data voltages output from the source drive ICs are supplied to the data lines D of the display panel 10.

A gate driving unit 110 includes a shift resistor, a level shift for converting an output signal of the shift resistor into a swing width suitable to drive the TFT of the liquid crystal cell, an output buffer, and the like. The gate driving unit 110 sequentially supplies gate pulses synchronized with the data voltages to gate lines G of the display panel 10.

The display panel controlling unit 140 receives the 2D image data RGB2D in the 2D mode and the multi-view image data MVD in the 3D mode, from the host system 160. In addition, the display panel controlling unit 140 receives timing signals and mode signal MODE from the host system 160. The timing signals may include a horizontal synchronization signal, a vertical synchronization signal, a data enable signal, a dot clock, and the like. The display panel controlling unit 140 may drive the display panel 10 at a predetermined frame frequency based on the timing signals and may generate a gate driving unit control signal GCS and a data driving unit control signal DCS based on the predetermined frame frequency. The display panel controlling unit 140 supplies the gate driving unit control signal GCS to the gate driving unit 110, and the 2D image data RGB2D or the multi-view image data MVD and the data driving unit control signal DCS to the data driving unit 120.

The switchable barrier 30 is disposed on the display panel 10. The switchable barrier 30 does not form the barrier in the 2D mode. The switchable barrier 30 forms the barrier for separating the first to n-th view images which are multi-view images displayed on the display panel 10 in the 3D mode into the first to n-th view regions. The switchable barrier 30 may be implemented in the liquid crystal panel as shown in FIG. 3. Hereinafter, the switchable barrier 30 will be described in detail with reference to FIGS. 2 and 3.

Figure 2:
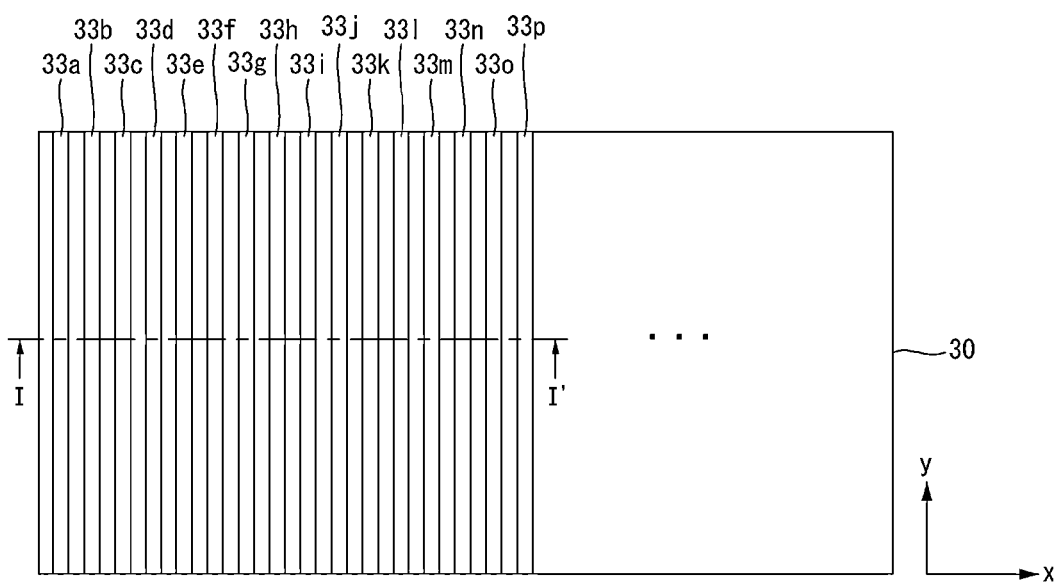
FIG. 2 is a plan view showing a switchable barrier of FIG. 1.
Figure 3:
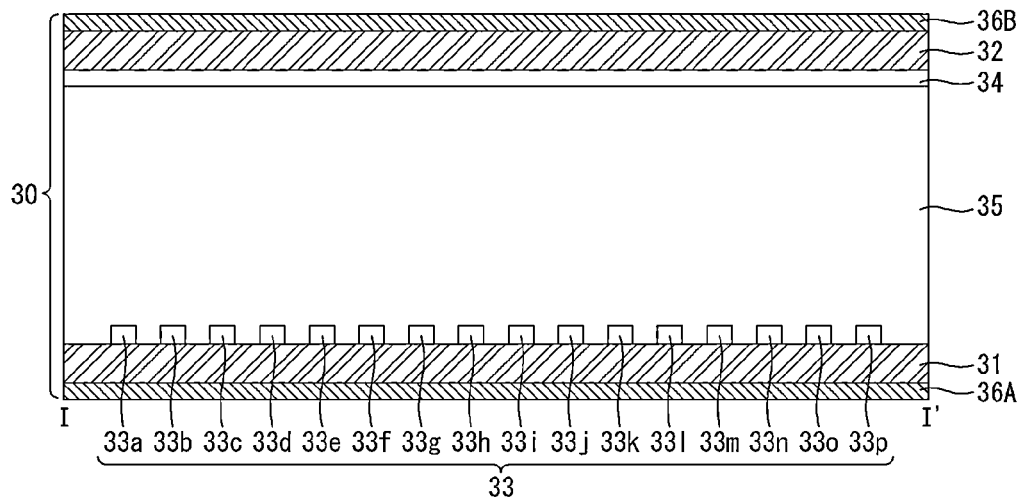
FIG. 3 is a cross-sectional view taken along line I-I' of FIG. 2.

FIG. 2 is a plan view showing a switchable barrier of FIG. 1 according to one embodiment. FIG. 3 is a cross-sectional view taken along line I-I' of FIG. 2. Referring to FIGS. 2 and 3, the switchable barrier 30 includes a first substrate 31, a second substrate 32, divided electrodes 33, a barrier common electrode 34, a liquid crystal layer 35, a first polarizing plate 36A, and a second polarizing plate 36B. Each of the first and second substrates 31 and 32 may be implemented by a glass or a plastic film. The first polarizing plate 36A is attached to one surface of the first substrate 31 opposite to the display panel 10 and the divided electrodes 33 are formed on the other surface of the first substrate 31. Each of the divided electrodes 33 is formed to be spaced apart from each other by predetermined intervals. In addition, the each of the divided electrodes 33 may be formed in parallel with a direction in which the barrier is formed in the switchable barrier 30. As shown in FIG. 2, the exemplary embodiment of the present invention mainly describes the case in which the barrier of the switchable barrier 30 is implemented in a vertical type formed in a vertical direction (y axis direction). However, the barrier of the switchable barrier 30 may be implemented in a slanted type slantly formed at a predetermined angle against the vertical direction. The driving voltages from the switchable barrier driving unit 130 supply to the divided electrodes 33.

The barrier common electrode 34 is formed on one surface of the second substrate 32 opposite to the first substrate 31 and the second polarizing plate 36B is attached to the other surface of the second substrate 32. The barrier common electrode 34 may be formed over the entire surface of the second substrate 32 as a single film. A light axis of the first polarizing plate 36A is formed to be orthogonal to a light axis of the second polarizing plate 36B. The barrier common voltage from the switchable barrier driving unit 130 is supplied to the barrier common electrode 34.

The liquid crystal layer 36 of the switchable barrier 30 is formed between the first substrate 31 and the second substrate 32. Liquid crystal molecules of the liquid crystal layer 35 are driven by the electric field between the each of the divided electrodes 33 and the barrier common electrode 34.

The switchable barrier driving unit 130 supplies the driving voltages to the divided electrodes 33 of the switchable barrier 30 and the barrier common voltage to the barrier common electrode 34 according to the barrier control data BCD of the switchable barrier controlling unit 150. The switchable barrier driving unit 130 is controlled to supply the first driving voltages to the all divided electrodes 33 of the switchable barrier 30 in the 2D mode. The liquid crystal molecules of the liquid crystal layer 36 driven by the electric field between the divided electrodes 33 to which the first driving voltage is supplied and the barrier common electrode 34 to which the barrier common voltage is supplied modulate the light so that the light that passes through the first polarizing plate 36A may pass through the second polarizing plate 36B. As a result, the switchable barrier 30 does not form the barrier in the 2D mode.

In addition, the switchable barrier driving unit 130 is controlled so as to supply the first driving voltages to the divided electrodes 33 of an opening region in the 3D mode and supply the second driving voltages to the divided electrodes 33 of a blocking region. The liquid crystal molecules of the liquid crystal layer 35 driven by the electric field between the divided electrodes 33 to which the second driving voltage is supplied and the barrier common electrode 34 to which the barrier common voltage is supplied does not modulate the light so that the light that passes through the first polarizing plate 36A may not pass through the second polarizing plate 36B. As a result, the switchable barrier 30 does not form the barrier in the opening region in the 3D mode and forms the barrier in the blocking region. Consequently, the switchable barrier 30 forms the barrier in the 3D mode, such that the first to n-th view images of the display panel 10 are separated into the first to n-th view regions, whereby the user may watch the stereoscopic image by the binocular parallax.

Meanwhile, the switchable barrier driving unit 130 may periodically reverse the polarity of the driving voltages supplied to the divided electrodes 33 in order to prevent DC afterimage of the liquid crystal. The DC afterimage of the liquid crystal indicates that charged particles of the liquid crystal molecules are accumulated on the alignment layer at the time of DC driving, and thus a pre-tilt angle of the liquid crystal molecules may be changed. The switchable barrier driving unit 130 performs an AC driving that periodically reverses the polarity of the driving voltages supplied to the divided electrodes 33, thereby making it possible to prevent the generation of the DC afterimage of the liquid crystal.

The switchable barrier controlling unit 150 receives mode signal MODE from the host system 160. The switchable barrier controlling unit 150 supplies the barrier control data BCD to the switchable barrier driving unit 130 so that the barrier is not formed in the switchable barrier 30 in the 2D mode. The switchable barrier controlling unit 150 supplies the barrier control data BCD to the switchable barrier driving unit 130 so that the barrier is formed in the blocking region of the switchable barrier 30 in the 3D mode and the barrier is not formed in the opening region thereof. In detail, the switchable barrier controlling unit 150 receives the multi-view image data MVD and the user position data ULC from the host system 160. The switchable barrier controlling unit 150 calculates the average picture level of the multi-view image data MVD, and controls the aperture ratio of the switchable barrier 30 depending on the average picture level. The aperture ratio of the switchable barrier 30 may be calculated by the following Equation 1. In the following Equation 1, APR indicates the aperture ratio (%), APA indicates width of the opening region, and BLA indicates width of the blocking region.

$$APR(\%) = \frac{APA}{APA + BLA} \times 100 \qquad \text{[Equation 1]}$$

In addition, the switchable barrier controlling unit 150 shifts the barrier according to the user position information of the user position data ULC. That is, a forming position of the barrier in the switchable barrier 30 depends on the user position. Consequently, the opening region and the blocking region of the switchable barrier 30 are determined according to the average picture level and the user position. The method for controlling the forming position of the barrier in the switchable barrier controlling unit 150 will be described below with reference to FIGS. 6 to 13.

The host system 160 supplies the 2D image data RGB2D or the multi-view image data MVD to the display panel controlling unit 140 through an interface such as a low voltage differential signaling (LVDS) interface, a transition minimized differential signaling (TMDS) interface, or the like. In addition, the host system 160 supplies the mode signal MODE, the timing signal, and the like to the display panel controlling unit 140. In addition, the host system 160 supplies the mode signal MODE, the timing signal, and the like to the display panel controlling unit 150. The host system 160 receives the user position data ULC including the user position information from the user position detecting unit 170 in the 3D mode. The host system 160 supplies the multi-view image data MVD and the user position data ULC to the switchable barrier controlling unit 150 in the 3D mode. The mode signal MODE is a signal indicating the 2D mode or 3D mode.

The user position detecting unit 170 detects the user position information by analyzing an image displayed on the front surface of the display panel photographed with the camera. The user position detecting unit 170 detects the user position information, such that the user tracking technology changing the forming position of the barrier in the switchable barrier 30 according to the position of the user may be applied even in the exemplary embodiments of the present invention.

The user position detecting unit 170 outputs the user position data ULC including the user position information to the host system 160 in the 3D mode. Hereinafter, the method for detecting the position of the user in the user position detecting unit 170 will be described in detail with reference to FIGS. 4 and 5.

Figure 4:
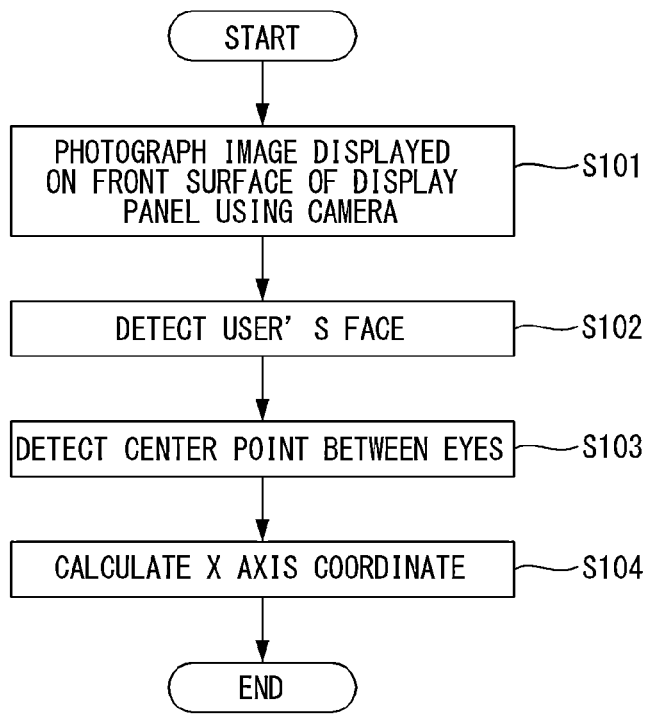
FIG. 4 is a flow chart showing a method for detecting a position of a user in the user position detecting unit of FIG. 1.
Figure 5:
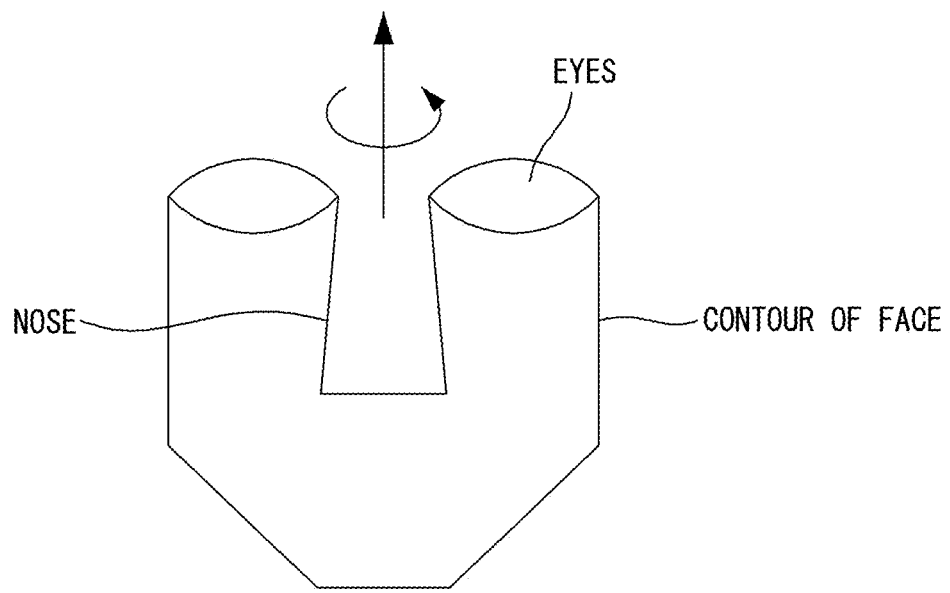
FIG. 5 is a view showing an example of a face mask for detecting a face of the user and result that the face mask is mapped on images captured by a camera.

FIG. 4 is a flow chart showing a method for detecting a position of a user in the user position detecting unit of FIG. 1 according to one embodiment. FIG. 5 is a view showing an example of a face mask for detecting a face of the user and result that the face mask is mapped on images captured by a camera. First, the user position detecting unit 170 stores the image displayed on a front surface of the display panel 10 photographed using the camera (not shown) (S101). Then, the user position detecting unit 170 detects the user's face from the image. As shown in FIG. 5, the user position detecting unit 170 may detect the user's face by mapping the preset face mask on the image in a form defining the contour features of eye, nose, and mouth (S102). Then, the user position detecting unit 170 detects the center point between the eyes (S103). Further, the user position detecting unit 170 calculates a x axis coordinate of the center point between the eyes (S104). The calculated x axis coordinate indicates the user's position on the x axis. The x axis may be an axis in parallel with a major axis of the display panel 10. The user position detecting unit 170 outputs the user position data ULC including the x axis coordinate which is the user position information to the host system 160.

Figure 6:
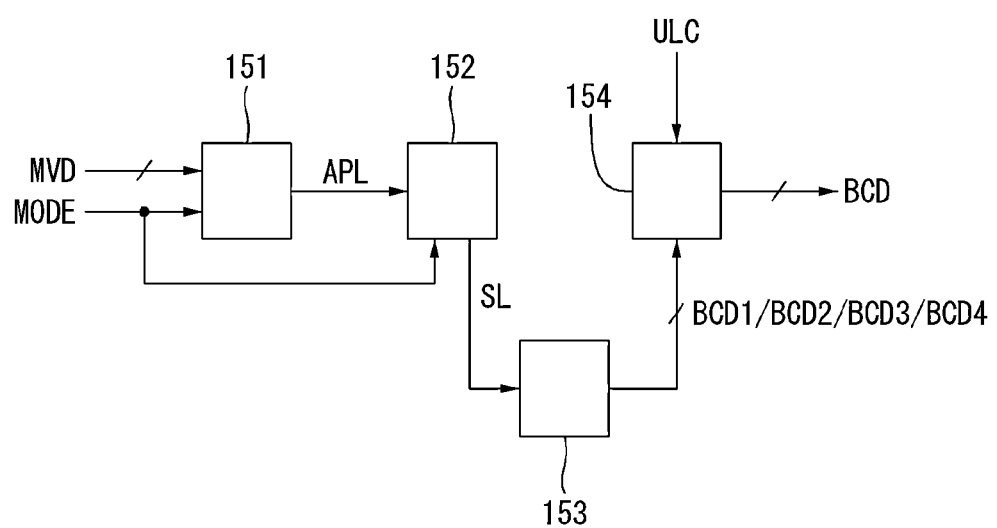
FIG. 6 is a detailed block view showing the switchable barrier controlling unit of FIG. 1.
Figure 7:
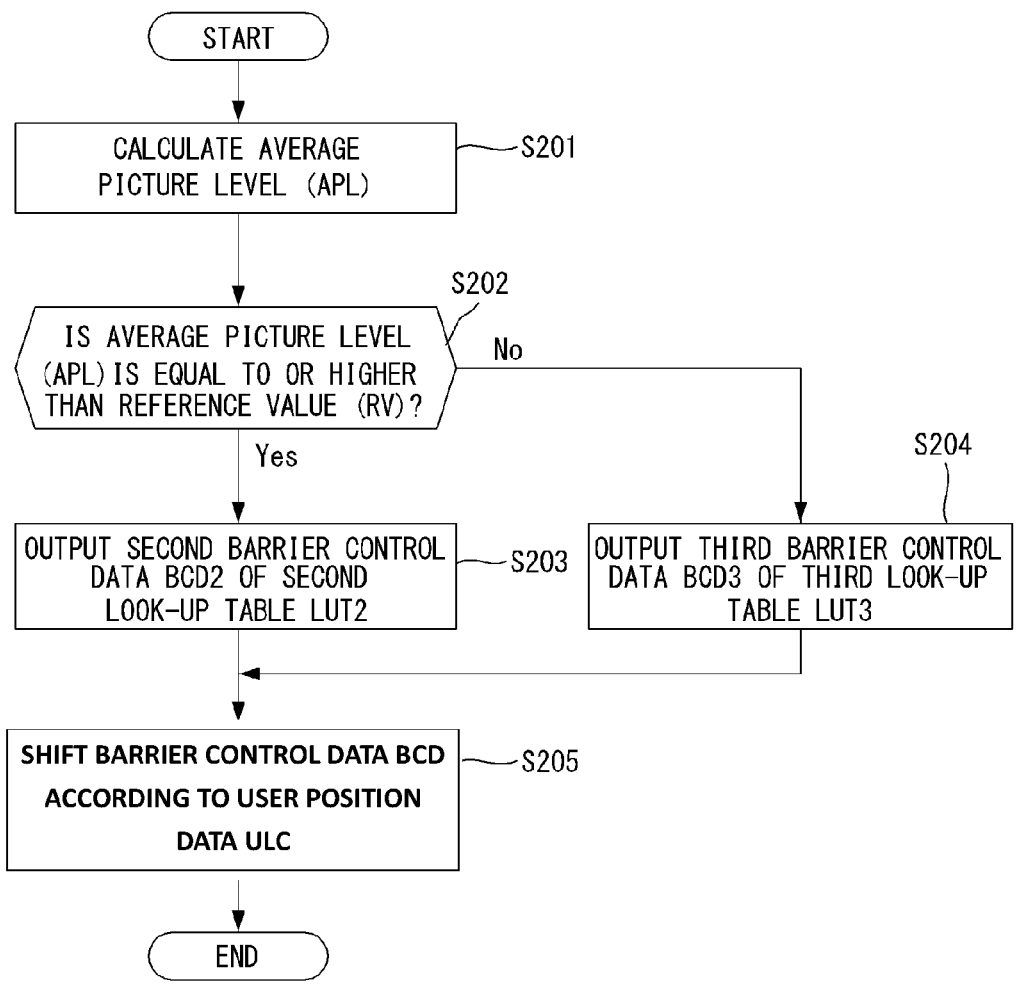
FIG. 7 is a flow chart showing a method for controlling a barrier according to an exemplary embodiment of the present invention.

FIG. 6 is a detailed block view showing the switchable barrier controlling unit of FIG. 1 according to one embodiment. FIG. 7 is a flow chart showing a method for controlling a barrier according to an exemplary embodiment of the present invention. Referring to FIG. 6, the switchable barrier controlling unit 150 includes an average picture level calculating portion 151, a select signal outputting portion 152, a memory 153, and a data shifting portion 154. The memory 153 includes a plurality of look-up tables. Hereinafter, according to the exemplary embodiment of the present invention, the method for controlling the switchable barrier of the switchable barrier controlling unit 150 will be described in detail with reference to FIGS. 6 and 7.

First, the average picture level calculating portion 151 may determine the 2D mode or 3D mode according to the mode signal MODE. The average picture level calculating portion 151 calculates the average picture level APL of the multi-view image data MVD in the 3D mode. The average picture level APL means a luminance average value of a first frame period. The average picture level calculating portion 151 may calculate the luminance value for each pixel in order to calculate the average picture level APL by the following Equation 2. The multi-view image data MVD includes a red, green, and blue digital data R, G, and B. In the following Equation 2, Y indicates the luminance value, R indicates the red digital data, the G indicates the green digital data, and the B indicates the blue digital data.

$$0.2998 \pm 0.589G + 0.114B \qquad \text{[Equation 2]}$$

The average picture level calculating portion 151 may calculate the average picture level APL by dividing the summed value into the number of the pixels after summing all of the luminance values for each pixel during the first frame period (S201).

Second, the select signal outputting portion 152 may determine the 2D mode or 3D mode according to the mode signal MODE. The select signal outputting portion 152 outputs a selecting signal SL indicating the first look-up table of the memory 153 in the 2D mode. The memory 153 outputs the first barrier control data BCD1 stored in the first look-up table to the data shifting portion 154 according to the selection signal SL in the 2D mode.

The select signal outputting portion 152 determines whether the average picture level APL is equal to or higher than the reference value RV in the 3D mode (S202). The select signal outputting portion 152 outputs the selection signal SL indicating the second look-up table when the average picture level APL is equal to or higher than the reference value RV (S203). In this case, the memory 153 outputs the second barrier control data BCD2 stored in the second look-up table to the data shifting portion 154 according to the selection signal SL. The select signal outputting portion 152 outputs the selection signal SL indicating the third look-up table when the average picture level APL is lower than the reference value RV (S204). In this case, the memory 153 outputs the third barrier control data BCD3 stored in the third look-up table to the data shifting portion 154 according to the selection signal SL.

FIG. 8 is a view showing first to third barrier control data stored in first to third look-up tables. Referring to FIG. 8, a 0 value in the first to third look-up tables LUT1, LUT2, and LUT3 means a digital value indicating the first driving voltage which is driving voltage in which the barrier is not formed, and a 1 value means a digital value indicating the second driving voltage which is driving voltage in which the barrier is formed. In addition, for convenience of explanation, FIG. 8 shows the case in which the first to third look-up tables LUT1, LUT2, and LUT3 store the digital values indicating the driving voltages supplied to eight divided electrodes 33 of the switchable barrier 30. Here, the eight divided electrodes 33 of the switchable barrier 30 may be implemented in one unit at the barrier.

The first barrier control data BCD1 stored in the first look-up table LUT1 is data output to the data shifting portion 154 in the 2D mode. Since the switchable barrier 30 does not form the barrier in the 2D mode, the first barrier control data BCD1 includes only the 0 value.

The second barrier control data BCD2 stored in the second look-up table LUT2 is data output to the data shifting portion 154 when the average picture level APL is equal to or higher than the reference value RV in the 3D mode. Since the switchable barrier 30 forms the barrier in the 3D mode, the second barrier control data BCD2 includes both of the 0 value and 1 value.

The third barrier control data BCD3 stored in the third look-up table LUT3 is data output to the data shifting portion 154 when the average picture level APL is lower than the reference value RV in the 3D mode. Since the switchable barrier 30 forms the barrier in the 3D mode, the third barrier control data BCD3 includes both of the 0 value and 1 value. The third barrier control data BCD3 has the 0 value less than the second barrier control data BCD2.

Since the 0 value indicates the driving voltage to which the barrier is not formed, the opening region is widened as a lot of 0 values are included. A detailed description thereof will be described with reference to FIGS. 9A and 9B.

Figure 9B:
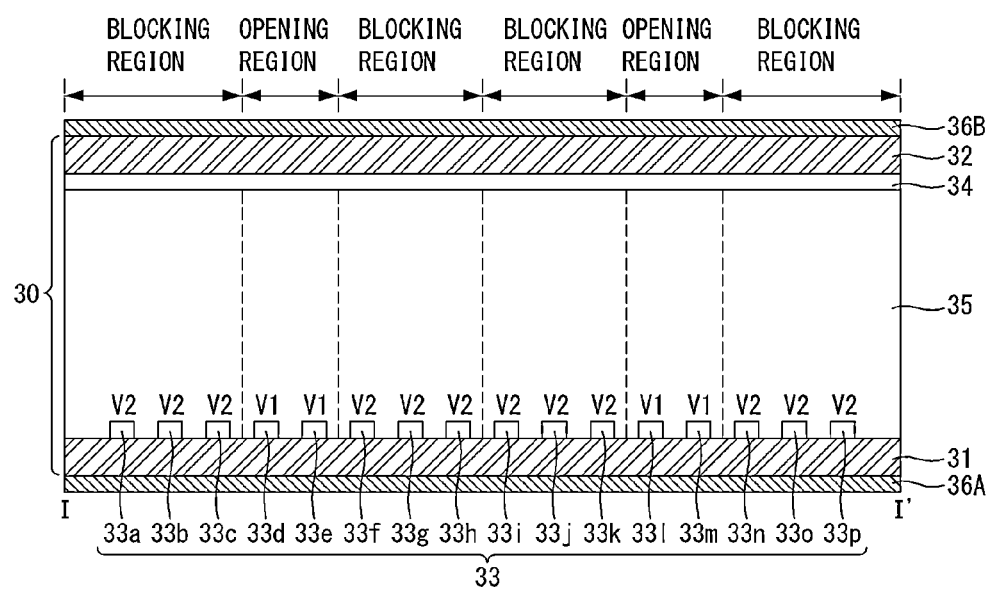

FIGS. 9A and 9B are views showing an opening region and a blocking region of a switchable barrier according to an aperture ratio. In detail, FIG. 9A is a view showing the case in which the switchable barrier driving unit 130 supplies the driving voltages to the divided electrodes 33 of the switchable barrier 30 according to the second barrier control data BCD2. FIG. 9B is a view showing the case in which the switchable barrier driving unit 130 supplies the driving voltages to the divided electrodes 33 of the switchable barrier 30 according to the third barrier control data BCD3.

Referring to FIG. 9A, in the case in which the switchable barrier driving unit 130 is controlled by the second barrier control data BCD2, the second driving voltage V2 is supplied to the first and second divided electrodes 33a and 33b, the seventh to tenth divided electrodes 33g, 33h, 33i and 33j, and the fifteenth and sixteenth divided electrodes 33o and 33p at the switchable barrier 30. The first driving voltage V1 is supplied to the third to sixth divided electrodes 33c, 33d, 33e, and 33f and the eleventh to fourteenth divided electrodes 33k, 33l, 33m, and 33n at the switchable barrier 30. The liquid crystal molecules of the liquid crystal layer 36 driven by the electric field between the divided electrodes 33 to which the first driving voltage V1 is supplied and the barrier common electrode 34 to which the barrier common voltage is supplied modulate the light so that the light that passes through the first polarizing plate 36A may pass through the second polarizing plate 36B. Therefore, the regions of the third to sixth divided electrodes 33c, 33d, 33e, and 33f and the eleventh to fourteenth divided electrodes 33k, 33l, 33m, and 33n to which the first driving voltage V1 is supplied may be defined as the opening region as shown in FIG. 9A. The liquid crystal molecules of the liquid crystal layer 36 driven by the electric field between the divided electrodes 33 to which the second driving voltage V2 is supplied and the barrier common electrode 34 to which the barrier common voltage is supplied does not modulate the light so that the light that passes through the first polarizing plate 36A may not pass through the second polarizing plate 36B. Therefore, the regions of the first and second divided electrodes 33a and 33b, the seventh and tenth divided electrodes 33g, 33h, 33i, and 33j, and the fifteenth and sixteenth divided electrodes 33o and 33p to which the first driving voltage V2 is supplied may be defined as the blocking region as shown in FIG. 9A.

Referring to FIG. 9B, in the case in which the switchable barrier driving unit 130 is controlled by the third barrier control data BCD3, the second driving voltage V2 is supplied to the first to third divided electrodes 33a, 33b, and 33c, the sixth to eighth divided electrodes 33f, 33g and 33h, the ninth to eleventh divided electrodes 33i, 33j, and 33k, and the fourteenth to sixteenth divided electrodes 33n, 33o and 33p at the switchable barrier 30. The first driving voltage V1 is supplied to the fourth, fifth, twelfth, and thirteenth divided electrodes 33d, 33e, 33l and 33m at the switchable barrier 30. The liquid crystal molecules of the liquid crystal layer 36 driven by the electric field between the divided electrodes 33 to which the first driving voltage is supplied and the barrier common electrode 34 to which the barrier common voltage is supplied modulate the light so that the light that passes through the first polarizing plate 36A may pass through the second polarizing plate 36B. Therefore, the regions of the fourth, fifth, twelfth, and thirteenth divided electrodes 33d, 33e, 33l and 33m to which the first driving voltage V1 is supplied may be defined as the opening region as shown in FIG. 9B. The liquid crystal molecules of the liquid crystal layer 36 driven by the electric field between the divided electrodes 33 to which the second driving voltage V2 is supplied and the barrier common electrode 34 to which the barrier common voltage is supplied does not modulate the light so that the light that passes through the first polarizing plate 36A may not pass through the second polarizing plate 36B. Therefore, the regions of the first to third divided electrodes 33a, 33b, and 33c, the sixth to eighth divided electrodes 33f, 33g and 33h, the ninth to eleventh divided electrodes 33i, 33j, and 33k, and the fourteenth to sixteenth divided electrodes 33n, 33o and 33p to which the second driving voltage V2 is supplied may be defined as the blocking region as shown in FIG. 9B.

As described above, in the case in which the switchable barrier 30 is controlled by the second barrier control data BCD2 rather than the third barrier control data BCD3, the opening region at the switchable barrier 30 is widened. That is, in the case in which the average picture level APL is equal to or higher than the reference value RV, the exemplary embodiment of the present invention controls the aperture ratio of the switchable barrier 30 higher than the case in which the average picture level APL is lower than the reference value RV.

Meanwhile, since the user tracking technology changes the forming position of the barrier by analyzing the position of the user after a movement of the user is completed, a predetermined time interval is present from the time when the movement of the user is completed to the time when the forming position of the barrier is changed. As a result, when the user moves from orthoscopic viewing region to a barrier viewing region during the predetermined time interval, the user may feel the flicker. In particular, as the luminance of the stereoscopic image displayed on the display panel 10 is high, the user may easily feel the flicker. The orthoscopic viewing region indicates a region where the left-eye of the user watches the left parallax image and the right-eye of the user watches the right parallax image, the barrier viewing region indicates a region where a black pattern corresponding to the barrier rather than the 3D image shown, and the flicker means flickering.

However, in the case in which the average picture level APL is equal to or higher than the reference value RV, the exemplary embodiment of the present invention highly controls the aperture ratio of the switchable barrier 30. Since each of the view regions is expanded as the aperture ratio of the switchable barrier 30 is high, the user may be reduced the number of the cases in which the user is positioned in the barrier viewing region during the predetermined time interval. That is, even if the user moves, the number of the cases in which the user is positioned in the orthoscopic viewing region during the predetermined time interval has been increased. Therefore, according to another exemplary embodiment of the present invention, a problem that the user feels inconvenience in the watching the stereoscopic image due to the flicker during the predetermined time interval may be solved.

Meanwhile, as the reference value RV is low, since the case in which the aperture ratio of the switchable barrier 30 is highly controlled is increased, the problem that the user feels inconvenience in the watching the stereoscopic image due to the flicker may be easily solved. However, the case in which the aperture ratio of the switchable barrier 30 is highly controlled, the view regions has been expanded, such that a region where the view regions adjacent to each other are overlapped is generated in the each of the view regions, thereby may lead to a 3D crosstalk. The 3D crosstalk means that the left and right parallax images looks overlapping in left-eye or right-eye of the user. Therefore, the reference value RV is preset to an appropriate value through the prior experiment (S202, S203, and S204).

Third, the data shifting portion 154 receives any one among the first to third barrier control data BCD1, BCD2, and BCD3 from the memory 153 according to the selection signal SL of the select signal outputting portion 152. In detail, the data shifting portion 154 sets the first barrier control data BCD1 input from the memory 153 to the barrier control data BCD in the 2D mode. The data shifting portion 154 sets any one of the second and third barrier control data BCD2 and BCD3 input from the memory 153 to the barrier control data BCD in the 3D mode.

In addition, the data shifting portion 154 receives the user position data ULC from the host system 160. The data shifting portion 154 may determine the position of the user according to the user position information of the user position data ULC. The user position information may be the x axis coordinate detected from the user position detecting unit 170. The data shifting portion 154 calculates the shift value of the barrier control data BCD based on the x axis coordinate of the user position data ULC.

For example, when a resolution of the image displayed on the front surface of the display panel 10 photographed with the camera is 1920×1080, the x axis coordinate may be represented by 1 to 1920. When the x axis coordinate is 960, the user is positioned at the center of the front surface of the display panel 10, such that the switchable barrier 30 needs not to shift the barrier. In this case, the data shifting portion 154 calculates the shift value of the barrier control data BCD to 0. However, when the x axis coordinate has different value, the data shifting portion 154 calculates the shift value of the barrier control data BCD based on a formula stored in advance.

Figure 10:
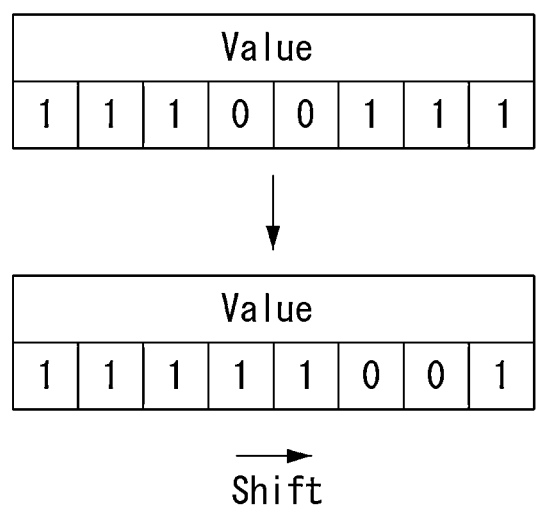
FIG. 10 is a view showing a shift of the barrier control data according to user position data.

FIG. 10 is a view showing a shift of the barrier control data according to user position data. FIG. 10 mainly describes the case in which the data shifting portion 154 sets the third barrier control data BCD3 to the barrier control data BCD. Referring to FIG. 10, the data shifting portion 154 shifts the barrier control data BCD according to the calculated shift value in the 3D mode. For example, the data shifting portion 154 may shift the barrier control data BCD as much as two spaces to the right as shown in FIG. 10. That is, the data shifting portion 154 may shift 11100111 to 11111001.

The data shifting portion 154 supplies the barrier control data BCD shifted according to the shift value to the switchable barrier driving unit 130 in the 3D mode. The switchable barrier driving unit 130 supplies the driving voltages to the divided electrodes 33 of the switchable barrier 30 and the barrier common voltage to the barrier common electrode 34 according to the barrier control data BCD (S205).

As described above, the exemplary embodiment of the present invention calculates the average picture level APL of the multi-view image data MVD in the 3D mode, calculates the user position information by analyzing the image displayed on the front surface of the display panel 10 photographed with a camera, and performs a control to form the barrier at the switchable barrier 30 according to the average picture level APL and the user position information. In particularly, in the case in which the average picture level APL is equal to or higher than the reference value RV, the exemplary embodiment of the present invention controls the aperture ratio of the switchable barrier 30 higher than the case in which the average picture level APL is lower than the reference value RV. When the aperture ratio of the switchable barrier 30 becomes high, the each of the view-regions is expanded, such that the exemplary embodiment of the present invention may greatly reduce the number of the cases in which the user moves from the orthoscopic viewing region to the barrier viewing region during the predetermined time interval. As a result, the exemplary embodiment of the present invention may solve a problem that the user feels inconvenience in the watching the stereoscopic image due to the flicker during the predetermined time interval.

Figure 11:
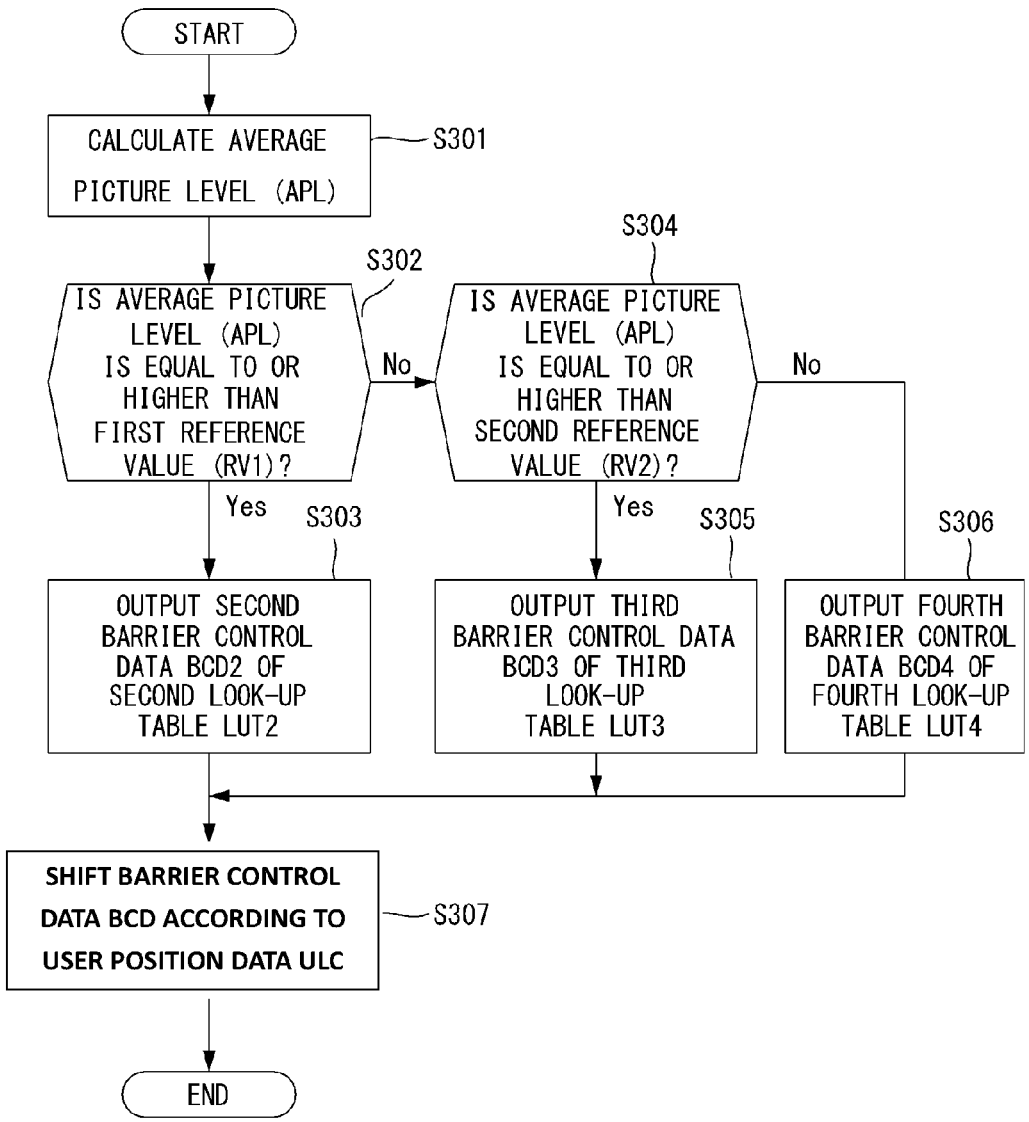
FIG. 11 is a flow chart showing a method for controlling a barrier according to another exemplary embodiment of the present invention.

FIG. 11 is a flow chart showing a method for controlling a barrier according to another exemplary embodiment of the present invention. Hereinafter, according to the another exemplary embodiment of the present invention, the method for controlling the switchable barrier of the switchable barrier controlling unit 150 will be described in detail with reference to FIGS. 6 and 11.

First, the average picture level calculating portion 151 calculates the average picture level APL of the multi-view image data MVD in the 3D mode. The method for calculating the average picture level APL of the average picture level calculating portion 151 is substantially the same as the method described at step S201 of FIG. 7 (S301).

Second, the select signal outputting portion 152 may determine the 2D mode or 3D mode according to the mode signal MODE. The select signal outputting portion 152 outputs a selecting signal SL indicating the first look-up table of the memory 153 in the 2D mode. The memory 153 outputs the first barrier control data BCD1 stored in the first look-up table to the data shifting portion 154 according to the selection signal SL in the 2D mode.

The select signal outputting portion 152 determines whether the average picture level APL is equal to or higher than a first reference value RV1 in the 3D mode (S302). The select signal outputting portion 152 outputs the selection signal SL indicating the second look-up table when the average picture level APL is equal to or higher than the first reference value RV1 (S303). In this case, the memory 153 outputs the second barrier control data BCD2 stored in the second look-up table to the data shifting portion 154 according to the selection signal SL. The select signal outputting portion 152 outputs the selection signal SL indicating the third look-up table when the average picture level APL is lower than the first reference value RV1 and equal to or higher than the second reference value RV2 (S304). In this case, the memory 153 outputs the third barrier control data BCD3 stored in the third look-up table to the data shifting portion 154 according to the selection signal SL (S305). The select signal outputting portion 152 outputs the selection signal SL indicating the fourth look-up table when the average picture level APL is lower than the second reference value RV2. In this case, the memory 153 outputs the fourth barrier control data BCD4 stored in the fourth look-up table to the data shifting portion 154 according to the selection signal SL (S306).

Figure 12:
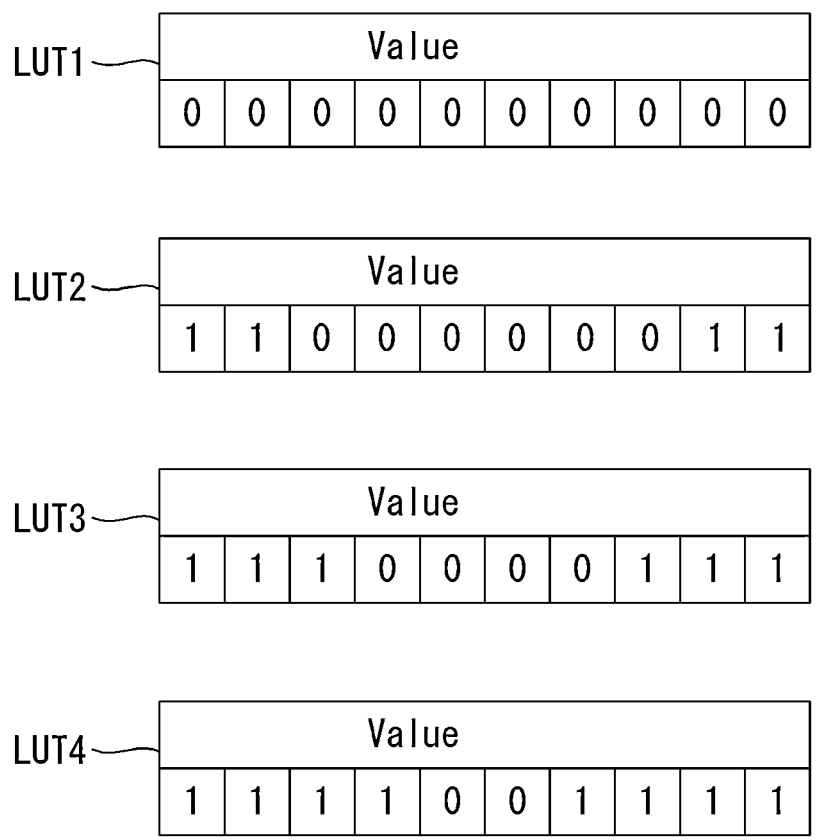
FIG. 12 is a view showing barrier control data stored in each of first to fourth look-up table.

FIG. 12 is a view showing first to fourth barrier control data stored in first to fourth look-up tables. Referring to FIG. 12, a 0 value in the first to fourth look-up tables LUT1, LUT2, LUT3 and LUT4 means a digital value indicating the first driving voltage which is driving voltage in which the barrier is not formed, and a 1 value means a digital value indicating the second driving voltage which is driving voltage in which the barrier is formed. In addition, for convenience of explanation, FIG. 12 shows the case in which the first to fourth look-up tables LUT1, LUT2, LUT3 and LUT4 store the digital values indicating the driving voltages supplied to ten divided electrodes 33 of the switchable barrier 30. Here, the ten divided electrodes 33 of the switchable barrier 30 may be implemented in one unit at the barrier.

The first barrier control data BCD1 stored in the first look-up table LUT1 is data output to the data shifting portion 154 in the 2D mode. Since the switchable barrier 30 does not form the barrier in the 2D mode, the first barrier control data BCD1 includes only the 0 value.

The second barrier control data BCD2 stored in the second look-up table LUT2 is data output to the data shifting portion 154 when the average picture level APL is equal to or higher than the first reference value RV1 in the 3D mode. Since the switchable barrier 30 forms the barrier in the 3D mode, the second barrier control data BCD2 includes both of the 0 value and 1 value.

The third barrier control data BCD3 stored in the third look-up table LUT3 is data output to the data shifting portion 154 when the average picture level APL is lower than the first reference value RV1 and is equal to or higher than the second reference value RV2 in the 3D mode. Since the switchable barrier 30 forms the barrier in the 3D mode, the third barrier control data BCD3 includes both of the 0 value and 1 value. The third barrier control data BCD3 has the 0 value less than the second barrier control data BCD2.

The fourth barrier control data BCD4 stored in the fourth look-up table LUT4 is data output to the data shifting portion 154 when the average picture level APL is lower than the second reference value RV2 in the 3D mode. Since the switchable barrier 30 forms the barrier in the 3D mode, the fourth barrier control data BCD4 includes both of the 0 value and 1 value. The fourth barrier control data BCD4 has the 0 value less than the third barrier control data BCD3.

Since the 0 value indicates the driving voltage to which the barrier is not formed, the opening region is widened as a lot of 0 values are included. A detailed description thereof was described with reference to FIGS. 9A and 9B.

As described above, the case in which the switchable barrier 30 is controlled by the third barrier control data BCD3 rather than the fourth barrier control data BCD4, and the case in which the switchable barrier 30 is controlled by the second barrier control data BCD2 rather than the third barrier control data BCD3, the opening region at the switchable barrier 30 is widened. That is, as the average picture level APL is high, the aperture ratio of the switchable barrier 30 is highly controlled in another exemplary embodiment of the present invention.

Meanwhile, since the user tracking technology changes the forming position of the barrier by analyzing the position of the user after a movement of the user is completed, a predetermined time interval is present from the time when the movement of the user is completed to the time when the forming position of the barrier is changed. As a result, when the user moves from orthoscopic viewing region to a barrier viewing region during the predetermined time interval, the user may feel the flicker. In particular, as the luminance of the stereoscopic image displayed on the display panel 10 is high, the user may easily feel the flicker. The orthoscopic viewing region indicates a region where the left-eye of the user watches the left parallax image and the right-eye of the user watches the right parallax image, the barrier viewing region indicates a region where a black pattern corresponding to the barrier rather than the 3D image shown, and the flicker means flickering.

As the average picture level APL is high, the aperture ratio of the switchable barrier 30 is highly controlled in another exemplary embodiment of the present invention. Since each of the view regions is expanded as the aperture ratio of the switchable barrier 30 is high, the user may be reduced the number of the cases in which the user is positioned in the barrier viewing region during the predetermined time interval. That is, even if the user moves, the number of the cases in which the user is positioned in the orthoscopic viewing region during the predetermined time interval has been increased. Therefore, according to another exemplary embodiment of the present invention, a problem that the user feels inconvenience in the watching the stereoscopic image due to the flicker during the predetermined time interval may be solved.

Meanwhile, as the first and second reference values RV1 and RV2 are low, since the case in which the aperture ratio of the switchable barrier 30 is highly controlled increases, the problem that the user feels inconvenience in the watching the stereoscopic image due to the flicker may be easily solved. However, the case in which the aperture ratio of the switchable barrier 30 is highly controlled, the view regions has been expanded, such that a region where the view regions adjacent to each other are overlapped is generated in the each of the view regions, thereby may lead to a 3D crosstalk. The 3D crosstalk means that the left and right parallax images looks overlapping in left-eye or right-eye of the user. Therefore, the first and second reference values RV1 and RV2 are preset to an appropriate value through the prior experiment (S302, S303, S304, S305 and S306).

Third, the data shifting portion 154 receives any one among the first to fourth barrier control data BCD1, BCD2, BCD3 and BCD from the memory 153 according to the selection signal SL of the select signal outputting portion 152. In detail, the data shifting portion 154 sets the first barrier control data BCD1 input from the memory 153 to the barrier control data BCD in the 2D mode. The data shifting portion 154 sets any one among the second and fourth barrier control data BCD2, BCD3 and BCD4 input from the memory 153 to the barrier control data BCD in the 3D mode.

In addition, the data shifting portion 154 receives the user position data ULC from the host system 160. The data shifting portion 154 may determine the position of the user according to the user position information of the user position data ULC. The user position information may be the x axis coordinate detected from the user position detecting unit 170. The data shifting portion 154 calculates the shift value of the barrier control data BCD based on the x axis coordinate of the user position data ULC.

For example, when a resolution of the image displayed on the front surface of the display panel 10 photographed with the camera is 1920×1080, the x axis coordinate may be represented by 1 to 1920. When the x axis coordinate is 960, the user is positioned at the center of the front surface of the display panel 10, such that the switchable barrier 30 needs not to shift the barrier. In this case, the data shifting portion 154 calculates the shift value of the barrier control data BCD to 0. However, when the x axis coordinate has different value, the data shifting portion 154 calculates the shift value of the barrier control data BCD based on the formula stored in advance in the 3D mode.

The data shifting portion 154 supplies the barrier control data BCD shifted according to the shift value to the switchable barrier driving unit 130 in the 3 mode. The switchable barrier driving unit 130 supplies the driving voltages to the divided electrodes 33 of the switchable barrier 30 and the barrier common voltage to the barrier common electrode 34 according to the barrier control data BCD (S307).

As described above, the another exemplary embodiment of the present invention calculates the average picture level APL of the multi-view image data MVD in the 3D mode, calculates the user position information by analyzing the image displayed on the front surface of the display panel 10 photographed with a camera, and performs a control to form the barrier at the switchable barrier 30 according to the average picture level APL and the user position information. In particularly, as the average picture level APL is high, the aperture ratio of the switchable barrier 30 is highly controlled in another exemplary embodiment of the present invention. When the aperture ratio of the switchable barrier 30 is high, the each of the view-regions is expanded, such that another exemplary embodiment of the present invention may greatly reduce the number of the cases in which the user moves from the orthoscopic viewing region to the barrier viewing region during the predetermined time interval. As a result, another exemplary embodiment of the present invention may solve a problem that the user feels inconvenience in the watching the stereoscopic image due to the flicker during the predetermined time interval.

The present invention calculates the average picture level of the multi-view image data in the 3D mode, calculates the user position information by analyzing an image displayed on the front surface of the display panel photographed with a camera, and performs a control to form the barrier at the switchable barrier 30 according to the average picture level APL and the user position information. When the aperture ratio of the switchable barrier 30 becomes high, the each of the view-regions is expanded, such that another exemplary embodiment of the present invention may greatly reduce the number of the cases in which the user moves from the orthoscopic viewing region to the barrier viewing region during the predetermined time interval. As a result, the present invention may solve a problem that the user feels inconvenience in the watching the stereoscopic image due to the flicker during the predetermined time interval.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display device comprising:
   a display panel displaying a multi-view image in a three-dimensional (3D) mode;
   a switchable barrier provided on the display panel in order to separate the multi-view image to form a barrier in the 3D mode;
   a user position detecting unit outputting a user position data including a user position information indicating that a user moves from a first position to a second position by analyzing an image displayed on a front surface of the display panel photographed with a camera;
   a switchable barrier controlling unit calculating an average picture level of the multi-view image in the 3D mode, establishing an aperture ratio of the switchable barrier for display of the multi-view image according to the average picture level, and moving the switchable barrier based on the user position information indicating that the user moves from the first position to the second position while maintaining the established aperture ratio where the established aperture ratio for the multi-view image is constant regardless of the user moving between the first position and the second position;
   a switchable barrier driving unit supplying driving voltages to divided electrodes of the switchable barrier under a control of the switchable barrier controlling unit and supplying a common voltage to a barrier common electrode; and
   a display panel driving unit converting the multi-view image into data voltages to supply the data voltages to data lines of the display panel and sequentially supplying gate pulses synchronized with the data voltages to gate lines of the display panel.

2. The stereoscopic image display device of claim 1, wherein the switchable barrier controlling unit, responsive to the average picture level being equal to or higher than a reference value, controls the aperture ratio of the switchable barrier to be larger than the aperture ratio corresponding to the average picture level being lower than the reference value.

3. The stereoscopic image display device of claim 2, wherein the switchable barrier controlling unit comprises:
   an average picture level calculating portion calculating the average picture level of the multi-view image in the 3D mode; and
   a memory outputting a first barrier control data stored in a first look-up table in a two-dimensional (2D) mode, a second barrier control data stored in a second look-up table when the average picture level is equal to or higher than the reference value in the 3D mode, and a third barrier control data stored in a third look-up table when the average picture level is lower than the reference value in the 3D mode.

4. The stereoscopic image display device of claim 3, wherein the switchable barrier controlling unit further comprises a data shifting portion setting the first barrier control data input from the memory to the barrier control data in the 2D mode and any one of the second and third barrier control data input from the memory to the barrier control data in the 3D mode, and shifting the barrier control data according to the user position information in the 3D mode.

5. The stereoscopic image display device of claim 1, wherein the switchable barrier controlling unit highly controls the aperture ratio of the switchable barrier as the average picture level is high.

6. The stereoscopic image display device of claim 5, wherein the switchable barrier controlling unit comprises:
an average picture level calculating portion calculating the average picture level of the multi-view image in the 3D mode; and
a memory outputting a first barrier control data stored in a first look-up table in a two-dimensional (2D) mode, a second barrier control data stored in a second look-up table when the average picture level is equal to or higher than a first reference luminance in the 3D mode, a third barrier control data stored in a third look-up table when the average picture level is lower than the first reference luminance and is equal to or higher than a second reference luminance in the 3D mode, and a fourth barrier control data stored in a fourth look-up table when the average picture level is lower than the second reference luminance in the 3D mode.

7. The stereoscopic image display device of claim 6, wherein the switchable barrier controlling unit further comprises
a data shifting portion setting the first barrier control data input from the memory to the barrier control data in the 2D mode and any one among the second, third, and fourth barrier control data input from the memory to the barrier control data in the 3D mode, and shifting the barrier control data according to the user position information in the 3D mode.

8. The stereoscopic image display device of claim 1, wherein the average picture level of the multi-view image in the 3D mode is an average luminance value of the multi-view image data to be applied across pixels of the display panel during a frame period corresponding to the multi-view image.

9. A method of driving a stereoscopic image display device including a display panel displaying multi-view images in a three-dimensional (3D) mode and a switchable barrier providing on the display panel in order to separate the multi-view images to form a barrier in the 3D mode, the method comprising:
outputting a user position data including a user position information indicating that a user moves from a first position to a second position by analyzing an image displayed on a front surface of the display panel photographed with a camera;
calculating an average picture level of a multi-view image in the 3D mode;
establishing an aperture ratio of the switchable barrier for display of the multi-view image according to the average picture level;
moving the switchable barrier based on the user position information indicating that the user moves from the first position to the second position while maintaining the established aperture ratio where the established aperture ratio for the multi-view image is constant regardless of the user moving between the first position and the second position;
supplying driving voltages to divided electrodes of the switchable barrier and supplying a common voltage to a barrier common electrode; and
converting the multi-view image into data voltages to supply the data voltages to data lines of the display panel and sequentially supplying gate pulses synchronized with the data voltages to gate lines of the display panel.

10. The method of claim 9, wherein establishing the aperture ratio of the switchable barrier according to the average picture level, responsive to the average picture level being equal to or higher than a reference value, controls the aperture ratio of the switchable barrier to be larger than the aperture ratio corresponding to the average picture level being lower than the reference value.

11. The method of claim 10, wherein establishing the aperture ratio of the switchable barrier according to the average picture level comprises outputting a first barrier control data stored in a first look-up table in a two-dimensional (2D) mode, a second barrier control data stored in a second look-up table when the average picture level is equal to or higher than the reference value in the 3D mode, and a third barrier control data stored in a third look-up table when the average picture level is lower than the reference value in the 3D mode.

12. The method of claim 11, wherein establishing the aperture ratio of the switchable barrier according to the average picture level further comprises setting the first barrier control data to the barrier control data in the 2D mode and any one of the second and third barrier control data to the barrier control data in the 3D mode, and shifting the barrier control data according to the user position information in the 13D mode.

13. The method of claim 9, wherein establishing the aperture ratio of the switchable barrier according to the average picture level highly controls the aperture ratio of the switchable barrier as the average picture level is high.

14. The method of claim 13, wherein establishing the aperture ratio of the switchable barrier according to the average picture level comprises outputting a first barrier control data stored in a first look-up table in a two-dimensional (2D) mode, a second barrier control data stored in a second look-up table when the average picture level is equal to or higher than a first reference luminance in the 3D mode, a third barrier control data stored in a third look-up table when the average picture level is lower than the first reference luminance and is equal to or higher than a second reference luminance in the 3D mode, and a fourth barrier control data stored in a fourth look-up table when the average picture level is lower than the second reference luminance in the 3D mode.

15. The method of claim 14, wherein:
establishing the aperture ratio of the switchable barrier according to the average picture level further comprises setting the first barrier control data to the barrier control data in the 2D mode and any one among the second, third, and fourth barrier control data to the barrier control data in the 3D mode, and
moving the switchable barrier based on the user position information while maintaining the established aperture ratio comprises shifting the barrier control data according to the user position information in the 3D mode.

16. The method of claim 9, wherein the average picture level of the multi-view image in the 3D mode is an average luminance value of the multi-view image data to be applied across pixels of the display panel during a frame period corresponding to the multi-view image.

* * * * *